United States Patent [19]

Anderson

[11] Patent Number: 4,639,128
[45] Date of Patent: Jan. 27, 1987

[54] AUTOMATIC PLATEN DOCUMENT STOP FOR ELECTROPHOTOGRAPHIC COPYING APPARATUS HAVING AN AUTOMATIC FEED ARRANGEMENT

[75] Inventor: Carl P. Anderson, Menlo Park, Calif.

[73] Assignees: Ricoh Company, Ltd., Tokyo, Japan; Ricoh Systems, Inc., San Jose, Calif.

[21] Appl. No.: 710,001

[22] Filed: Mar. 8, 1985

[51] Int. Cl.⁴ .................... G03B 27/62; G03G 15/00
[52] U.S. Cl. .................................. 355/75; 271/246; 271/901
[58] Field of Search ............... 355/3 SH, 14 SH, 75; 271/245, 246, 901

[56] References Cited

U.S. PATENT DOCUMENTS

| | | | |
|---|---|---|---|
| 3,672,663 | 6/1972 | Tomlinson | 271/901 X |
| 3,804,514 | 4/1974 | Jasinski | 355/75 |
| 3,910,570 | 10/1975 | Bleau | 271/245 |
| 4,138,102 | 2/1979 | Palmer | 271/901 X |
| 4,334,674 | 6/1982 | Ishii | 271/245 |
| 4,440,387 | 4/1984 | Ikoma et al. | 271/245 |

Primary Examiner—Fred L. Braun
Attorney, Agent, or Firm—Flehr, Hohbach, Test, Albritton & Herbert

[57] ABSTRACT

A copying device having an automatic document feed has a bar which extends across a substantial portion of the document path out of alignment with the image scanning portion of the platen. This bar is of a magnetically receptive material so that it is responsive to movement of a magnet which is located on the opposite side of the document-moving belt. When a document is being moved by the belt into the document exposing region, the document stop bar rests on the platen or at the edge of the platen so that the leading edge of the document butts against it. When the document is to be ejected, the magnet is moved, raising the document stop bar out of the document path; a roller which is adjacent the belt and the document being copied can now be rotated and eject the document below the document stop. In addition to lifting the magnet and therefore the document stop bar, the magnet moves slightly forward along the document path so that the edge of the document is removed from the document stop bar. In this way, the document does not bind against the stop bar and the document may be easily ejected.

5 Claims, 4 Drawing Figures

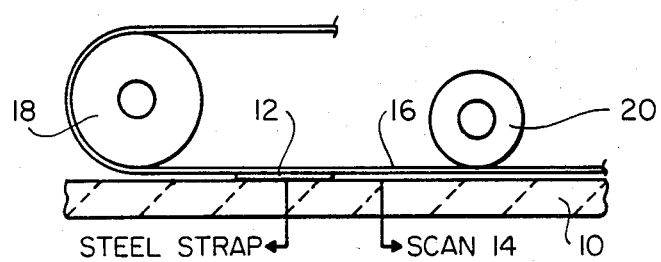
FIG_1
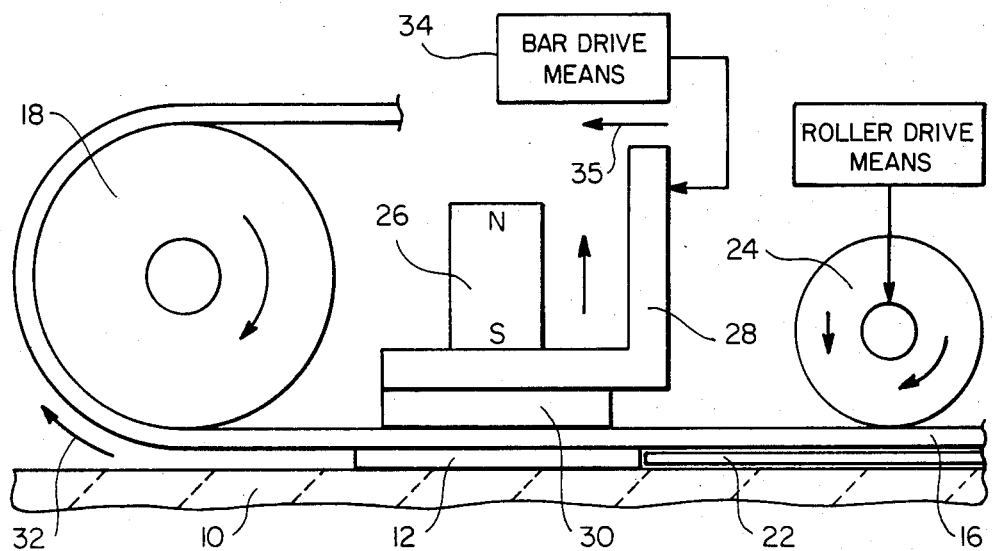
FIG_2
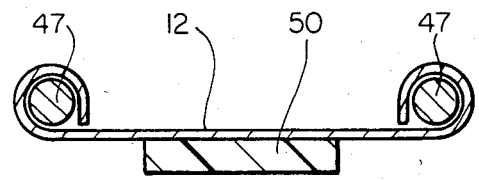
FIG_4

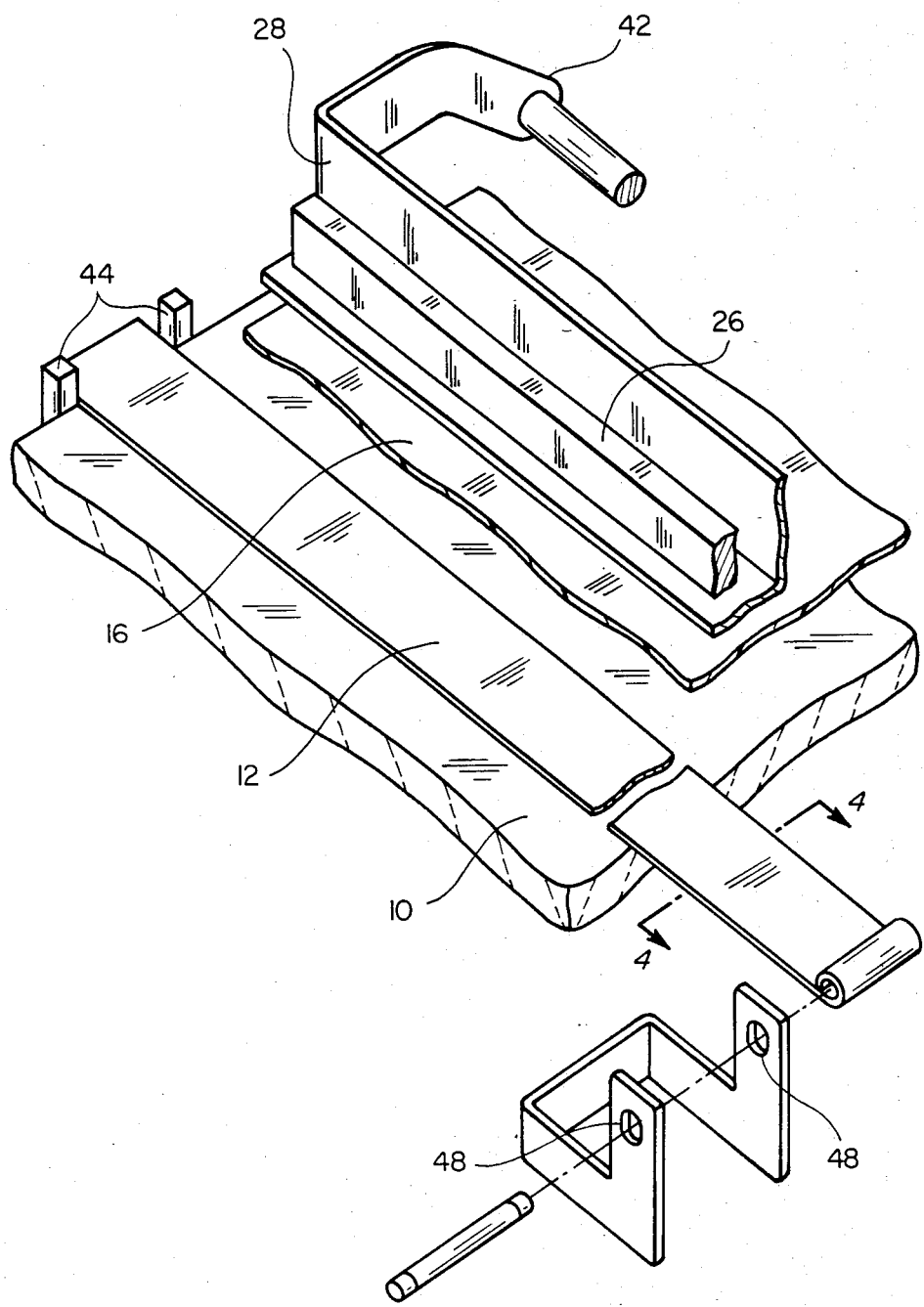
FIG_3

AUTOMATIC PLATEN DOCUMENT STOP FOR ELECTROPHOTOGRAPHIC COPYING APPARATUS HAVING AN AUTOMATIC FEED ARRANGEMENT

The present invention relates generally to electrophotographic copying apparatus and more particularly to one designed to automatically feed documents through the imaging station.

In a copying machine of the type where the document to be copied is to be automatically fed into registration with the platen through which the image is to be exposed, it is necessary to stop the document in alignment with this imaging station. In the past, this has been done by having the document slide up against a raised metallic edge along the glass platen; when the copy step has been completed, the leading edge of the paper must be raised so that the document can be carried away and ejected to be replaced by the next succeeding document.

It is an objective of the present invention to provide an improved means of stopping the document in alignment with the imaging station.

It is a further objective of the present invention to provide a simplified device for stopping the documents, which does not interfere with any of the imaging area.

It is a further objective of the present invention to incorporate means for easily disengaging the document stop from the leading edge of the paper, so that the document to be copied can be reliably ejected.

Another objective of the present invention is to provide a device which simplifies the document ejection mechanism by eliminating the need to lift the leading edge of the paper to eject it; instead, the document stop itself is lifted out of the paper path and the document is then ejected.

These and other objectives of the present invention are achieved by a device which includes a bar which extends across a substantial portion of the document path out of alignment with the image scanning portion of the platen. This bar is of a magnetically receptive material so that it is responsive to movement of a magnet which is located on the opposite side of the document-moving belt. When a document is being moved by the belt into the document exposing region, the document stop bar rests on the platen or at the edge of the platen so that the leading edge of the document butts against it. When the document is to be ejected, the magnet is moved, raising the document stop bar out of the document path; a roller which is adjacent the belt and the document being copied can now be rotated and eject the document below the document stop.

Preferably, in addition to lifting the magnet and therefore the document stop bar, the magnet moves slightly forward along the document path so that the edge of the document is removed from the document stop bar. In this way, the document does not bind against the stop bar and the document may be easily ejected.

The overall document stop assembly and sequence of operation will be more clearly understood by reference to the drawings wherein:

FIG. 1 is a vertical sectional view of the imaging area of a copying machine;

FIG. 2 is an elevation of the essential elements of the document stopping system of the present invention;

FIG. 3 is a perspective view of a mechanical implementation of several of the key elements of the present invention; and FIG. 4 is a sectional view along line 4—4 of FIG. 3 showing the document stop bar which rests on the platen or against the document to be copied.

This invention is generally intended for use with an electrophotographic copying apparatus which includes the necessary components for making copies from original documents. These components include, for example, a rotatable drum having a photosensitive outer circumferencial surface; means for forming an electrostatic image corresponding to the original being copied on the drum's photosensitive surface; means for developing the imaged form using suitable toner; and means for it transferring the applied toner from the drum to a blank sheet which ultimately becomes the final copy. The apparatus also includes other readily provided components which have not been mentioned including a copying platen which supports the original document as the latter is being copied. For a more detailed description of many of these components including a particular copying platen, reference is made to U.S. Pat. No. 4,384,784 incorporated herein by reference.

The present invention is specifically intended to stop the travel of a document to be copied across the surface of a platen 10 (shown generally in FIG. 1). The document stop 12 lies adjacent the image scanning area 14 through which the document is exposed to the photosensitive surface. A belt 16 carries the document into and out of registration with the platen in response to rotation of a drive wheel 18. A second supplementary roller 20 is provided to enhance contact between the belt and the document, especially as it is moved out of alignment with the platen.

The operation of the present invention can be described best by reference to FIG. 2. At the beginning of a copying cycle, the stop strip is in contact with the platen 10 as the document 22 is moving into registration with the platen 10. The stop strip 12 may be in contact with the platen glass, although as pointed out previously, it lies adjacent the image scanning area. The belt 16, driven by rotation of roller 18, moves the paper to be copied 22 up to and against the document stop 12 with the leading edge of the paper stopping against the stop strip 12. Movement of the belt 16 stops. At this point the scan occurs, traversing the area underlying the document and adjacent the area on which the stop strip 12 lies.

Upon completion of the image scan (although it is possible to execute this step earlier), the stop strip magnet 26 operates. That is, the magnet 26, which is carried in a preferred embodiment on a lift mechanism 28 which rides over the belt 16 on a Teflon insert 30, lifts vertically, lifting the magnetic keeper strip 12 above the document paper path. Alternatively, an electromagnet may be used which is energized to lift the magnetic keeper up against the belt, although this would probably be less reliable and noisier.

The exit pressure roll 24 is now turned on and the belt drive roller 18 is activated to eject the paper along the path 32. Once the document is ejected, the stop strip 12 can now be returned to its resting position upon the platen to stop the next document which is injected for copying. It should be noted that the bar drive means 34 may include means for shifting the magnet 26 and/or magnet support 28 slightly forward, (as shown by arrow 35) before lifting the document stop 12; although this movement may be only microscopic, it disengages the edge of the document stop from the document 22, and thereby avoids binding and lifting of the leading edge of the document by the document stop when the document stop is lifted out of the document path.

An exemplary mechanical structure for implementing this invention is shown in FIG. 3. The magnet 26 rests on the frame 28 to be carried into and out of its resting position atop the belt 16 by a lever 42. A return spring (not shown) can be provided to return the magnet to its resting position, thereby returning the document stop 12 to its resting place. To prevent any forward movement of the document stop with movement of the belt 16, a simple pair of posts 44 may be provided on either side of the strip, of sufficient height to remain in contact with the document stop even when it is lifted off the platen.

Alternatively, as shown at the right-hand end of FIG. 3, a frame can be bolted through a rolled end of the document strip to firmly hold the strip in place; by providing oval-shaped holes 48, room for the small lifting (about 0.03") which is necessary to clear the document path is allowed.

A cross-sectional view of the document stop is shown in FIG. 4 and simply includes the restraining bars 47, the magnetic keeper strip 12, and in this embodiment a buffering pad 50. A buffering pad is used where the document stop is to rest on the platen, to prevent any marring or scratching of the platen.

Alternative embodiments of the present invention may become apparent to a person of skill in the art who studies the present invention disclosure. Therefore, the subject invention is to be limited only by the following claims.

What is claimed is:

1. In an electrophotographic copying apparatus designed to make a copy of a document automatically fed into an imaging station comprising a platen aligned with an electrophotographic drum, a belt movable along a path over the surface of the platen to carry said document into alignment with said image station, a document stop located between said belt and said platen comprising a metal strip extending substantially across the full width of the document path and means adjacent the platen for restraining the metal strip against movement along the path of the paper, and means for moving said document stop from a first position interrupting said path to a second position above and adjacent said path comprising a magnetic device aligned with the metal strip and separated from said stop by the belt, movement of said magnetic device carrying said metal strip therewith from said first position to said second position.

2. A copying apparatus as claimed in claim 1 wherein said magnetic device is slidable over the upper surface of said belt.

3. A copying apparatus as claimed in claim 1 wherein said moving means comprises a mechanical lifter coupled to said magnetic device for moving said device from a first position separated from said platen by said stop strip to a second position above and more distant from said platen, thereby raising said document stop off said platen.

4. A copying apparatus as claimed in claim 3 including means for moving said document stop slightly forward along said document path while moving said stop from said first position to said second position, thereby disengaging said document stop from the document being copied.

5. A copying apparatus as claimed in claim 4 further comprising a pressure exit roller contacting said belt adjacent said document copying area and spaced from said document stop to overlie the aligned document, means for pressing said roller against said belt and said document, and means operative for rotating said roller to eject said document when said document stop is in said second position.

* * * * *